United States Patent
Song et al.

(10) Patent No.: US 9,131,188 B2
(45) Date of Patent: Sep. 8, 2015

(54) IMAGE DISPLAY DEVICE AND CONTROLLING METHOD THEREOF

(75) Inventors: Seong-Geun Song, Pyeongtaek-si (KR); Min-Goo Kang, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 432 days.

(21) Appl. No.: 12/996,661

(22) PCT Filed: Dec. 29, 2009

(86) PCT No.: PCT/KR2009/007884
§ 371 (c)(1),
(2), (4) Date: Dec. 7, 2010

(87) PCT Pub. No.: WO2010/077063
PCT Pub. Date: Jul. 8, 2010

(65) Prior Publication Data
US 2011/0093817 A1   Apr. 21, 2011

(30) Foreign Application Priority Data
Dec. 30, 2008   (KR) .......................... 10-2008-0136708

(51) Int. Cl.
| | | |
|---|---|---|
| *G06F 3/048* | (2013.01) | |
| *H04N 5/445* | (2011.01) | |
| *H04N 21/431* | (2011.01) | |
| *G06F 3/0482* | (2013.01) | |
| *H04N 21/422* | (2011.01) | |

(Continued)

(52) U.S. Cl.
CPC .......... *H04N 5/44513* (2013.01); *G06F 3/0482* (2013.01); *H04N 5/44543* (2013.01); *H04N 21/42204* (2013.01); *H04N 21/4312* (2013.01); *H04N 21/485* (2013.01); *H04N 21/4828* (2013.01)

(58) Field of Classification Search
USPC .................................. 715/841, 764; 345/168
See application file for complete search history.

(56) References Cited

U.S. PATENT DOCUMENTS

| | | | | |
|---|---|---|---|---|
| 5,487,104 | A | * | 1/1996 | Baals et al. ................ 379/93.17 |
| 6,104,334 | A | * | 8/2000 | Allport ......................... 341/175 |
| 6,757,001 | B2 | * | 6/2004 | Allport ......................... 715/840 |

(Continued)

FOREIGN PATENT DOCUMENTS

| | | |
|---|---|---|
| JP | 9-219819 A | 8/1997 |
| JP | 2003076350 A * | 3/2003 |

(Continued)

OTHER PUBLICATIONS

Webpage: "Testbericht: Dell 2709W Teil 5", Dominik Foht, www.prad.de (3 pages) (Jul. 3, 2008).

(Continued)

*Primary Examiner* — Dino Kujundzic
(74) *Attorney, Agent, or Firm* — Birch, Stewart, Kolasch & Birch, LLP

(57) ABSTRACT

Provided are an image display device, a key input for controlling the image display device, and a corresponding operating method. The method includes detecting an input of at least one of control keys provided at a predetermined area on the image display device and displaying a control key OSD corresponding to the at least one control key, receiving an input of one of the control keys while the control key OSD is displayed and changing the displayed control key OSD to select key OSDs for selecting menu items corresponding to the inputted control key, and displaying the select key OSDs.

7 Claims, 6 Drawing Sheets

(51) Int. Cl.
*H04N 21/485* (2011.01)
*H04N 21/482* (2011.01)

(56) References Cited

U.S. PATENT DOCUMENTS

| | | | |
|---|---|---|---|
| 2003/0076315 A1* | 4/2003 | Yu | 345/211 |
| 2003/0090863 A1* | 5/2003 | Yu | 361/681 |
| 2004/0211282 A1* | 10/2004 | Kim | 74/473.3 |
| 2005/0204311 A1 | 9/2005 | Kim | |
| 2006/0244863 A1* | 11/2006 | Baikie et al. | 348/569 |
| 2007/0033626 A1* | 2/2007 | Yang et al. | 725/105 |
| 2009/0312062 A1* | 12/2009 | Horodezky et al. | 455/566 |
| 2010/0001957 A1* | 1/2010 | Lee | 345/168 |

FOREIGN PATENT DOCUMENTS

| | | | | |
|---|---|---|---|---|
| KR | 10-2000-0050694 A | | 8/2000 | |
| KR | 10-2005-0090823 A | | 9/2005 | |
| KR | 10-2005-0109 | * | 11/2005 | H04N 5/445 |

OTHER PUBLICATIONS

"Soft Key", http://en.wikipedia.org/wiki/Soft_key, Wikipedia, 1 page, Dec. 21, 2007.

* cited by examiner (a)

(b)

IMAGE DISPLAY DEVICE AND CONTROLLING METHOD THEREOF

CROSS-REFERENCE TO RELATED APPLICATIONS

The present application claims priority under 35 U.S.C. 119 and 35 U.S.C. 365 to Korean Patent Application No. 10-2008-0136708 (filed on 30 Dec. 2008), which is hereby incorporated by reference in its entirety.

BACKGROUND

The present disclosure relates to an image display device, and to a key input for controlling the image display device and a corresponding operating method.

In addition to providing the limited function for simply outputting a broadcast program, a related art image display device includes functions to perform operations for various additional functions. Thus, for the sake of smooth manipulation according to a user's personal preferences, the user needs to use an external control unit, such as a remote controller having a multiplicity of keys or enabling various function key inputs to be easily entered.

However, even image display devices that do not employ a remote controller are currently equipped with control keys for simple channel/volume control and control keys on one side of the image display device for entering menus. Although this allows a user without a separate controller to input simple control signals by pressing control keys, most of these keys are usually positioned in locations difficult to see for the sake of aesthetics.

Accordingly, it is difficult for a user to easily discern the functions corresponding to the control keys. Further, entering menus by using only a certain number of control keys is not as easy as using a remote controller, and a menu must be entered through a process of performing several key inputs.

SUMMARY

An aspect of the present invention provides quickness and ease of key inputs for controlling an image display device.

Another aspect of the present invention provides the ability to perform various functions using the keys provided on an image display device.

According to at least one of embodiments, a method for controlling an image display device includes: sensing an input of at least one of control keys provided to a given area of the image display device; displaying control key OSDs corresponding to said at least one of inputted control keys; receiving one of the control keys while the control key OSDs are displayed; changing the displayed control key OSDs into select key OSDs capable of choosing menu items corresponding to the received control key, thereby displaying the select key OSDs.

According to another embodiment, an image display device includes: a key input unit including at least one control key in a given area of the image display device; an OSD processing unit for generating OSDs at a location corresponding to the key input unit according to the input of said at least one control key; a display unit for displaying OSDs correspondingly to the key input unit and changing the OSDs according to the input of said at least one control key; a control unit for sensing an input signal of a key inputted from the key input unit and controlling to display OSDs corresponding to an inputted key and flexibly change the OSDs according to the inputted key signal to display the changed OSDs.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
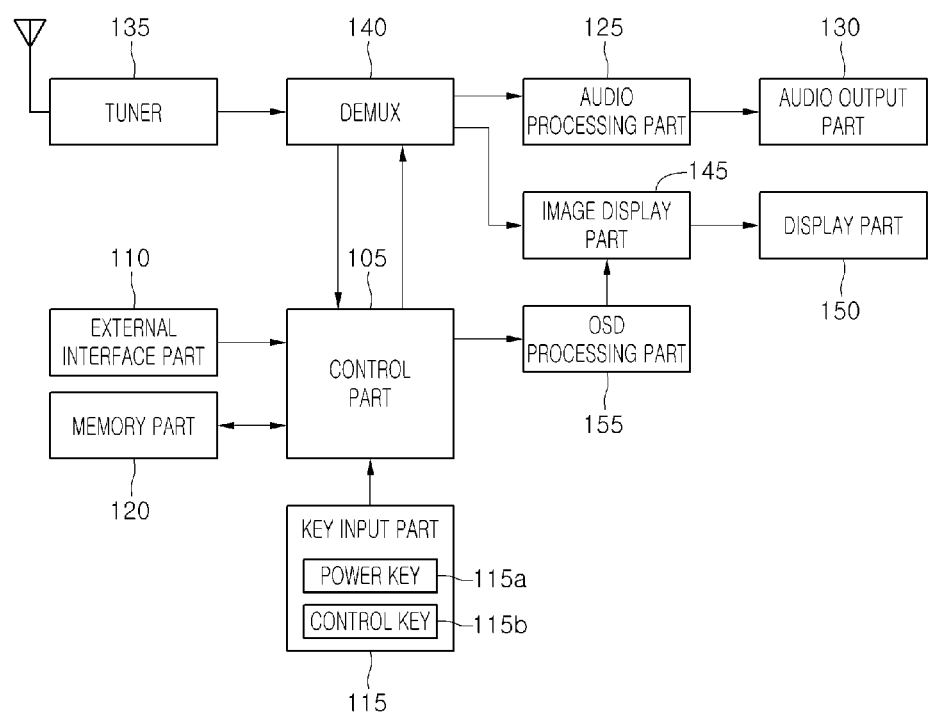
FIG. 1 is a block diagram of an image display device according to the present invention.

FIG. 1 is a block diagram of an image display device according to the present invention.

A control unit 105 outputs various broadcast signals received through a tuner unit 135 to a demux 140 which in turn divides them into audio/image/data signals. The control unit 105 according to an embodiment senses a key input from a key input unit 115 provided on the image display device and flexibly displays a corresponding OSD in a display unit 150.

An external interface unit 110 performs a connecting function to enable receipt of an audio or image that can be output from the image display device by an external device. The key input unit 115 may have a plurality of control keys 115b and a power key 115a for turning power ON/OFF, provided at a predetermined location on the image display device. In particular, the plurality of control keys 115b in the key input unit 115 for controlling the image display device according to an embodiment is provided at one side of the image display device. When one of the control keys is input, OSDs associated with the plurality of control keys may be displayed in the display unit 150.

A memory unit 120 performs the functions of storing data received from the outside or generated through a user input and temporarily or permanently storing a various data generated according to the operation of internal function parts. The memory unit 120 according to an embodiment performs the function of storing data for enabling an OSD corresponding to a key input in the key input unit 115 to be flexibly displayed on the display unit 150.

The display unit 150 displays an image signal, which is divided by the mux 140 from the broadcast signals received through the tuner unit 135 and processed by an image processing unit 145. In particular, the display unit 150 according to an embodiment performs the function of displaying an OSD for the control key that is input from the key input unit 115 and may display an OSD changed through an input of the control keys 115b according to the control of the control unit 105.

An OSD processing unit 155 performs the function of generating text or an image representing the operational state or information of the image display device. In particular, the OSD processing unit 155 according to an embodiment performs the function of generating OSDs for the key input unit functions and associated menu items at a location corresponding to the key input unit 115 on the image display device.

Figure 2:
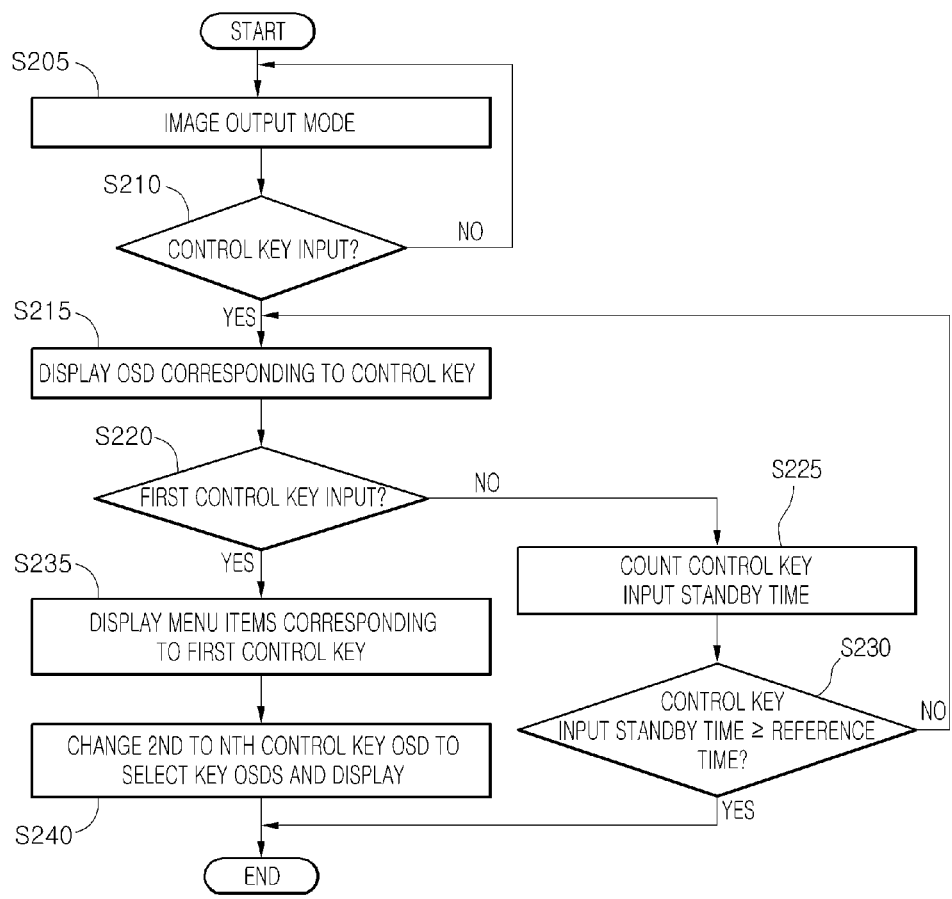
FIG. 2 is a control operation flowchart for an image display device according to an embodiment.

The operation of the image display device according to an embodiment will be described in terms of the above-configured image display device with reference to FIGS. 2 to 4.

In operation S205, the control unit 105 performs an image output mode for outputting an image for a broadcast signal received through the tuner unit 135 or displaying an image received from an external device connected by the external interface unit 110.

In the image output mode, when the control unit detects the input of a control key 115*b* having a menu key for controlling the image display device from among the plurality of keys of the key input unit 115 in operation S210, the control unit 105 display all the OSDs for the plurality of control keys 115*b* in the display unit 150, irrespective of the kind of control key that was input.

Figure 3:
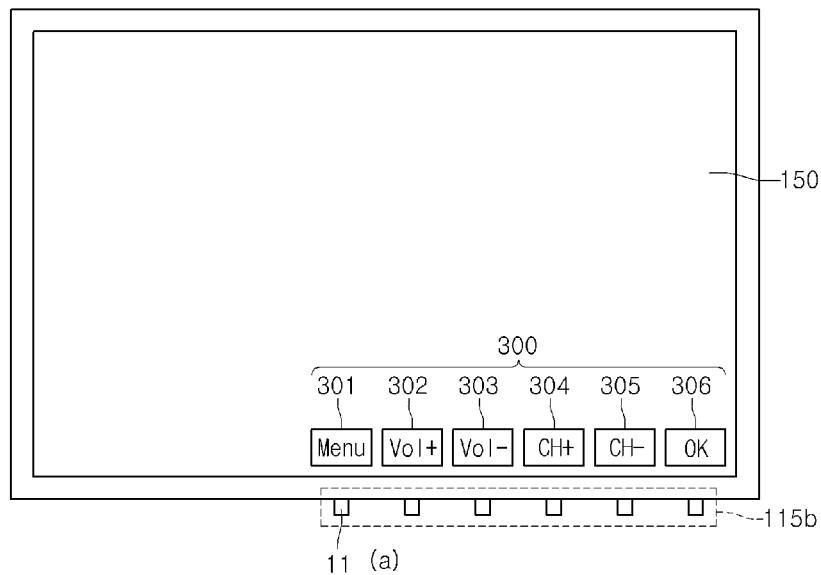
FIG. 3 is an exemplary diagram of a control key OSD screen of an image display device according to an embodiment.
Figure 3:
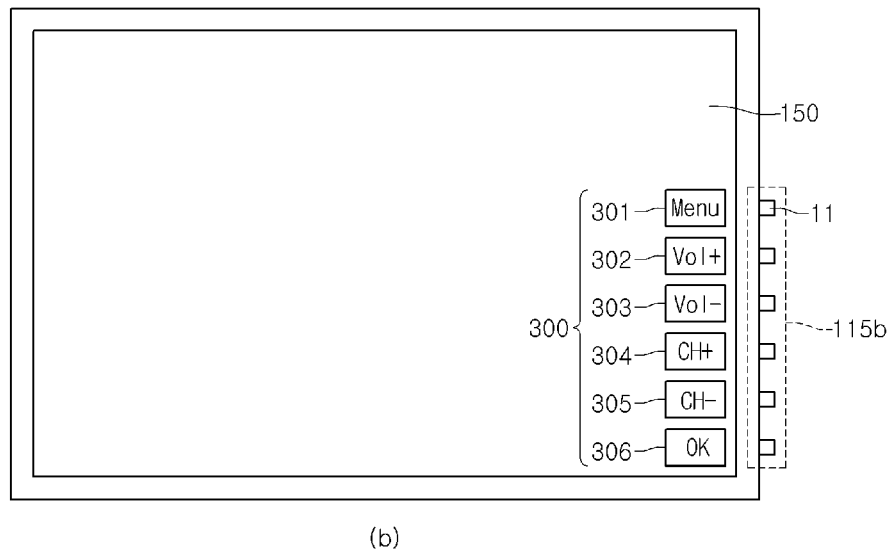
Figure 4:
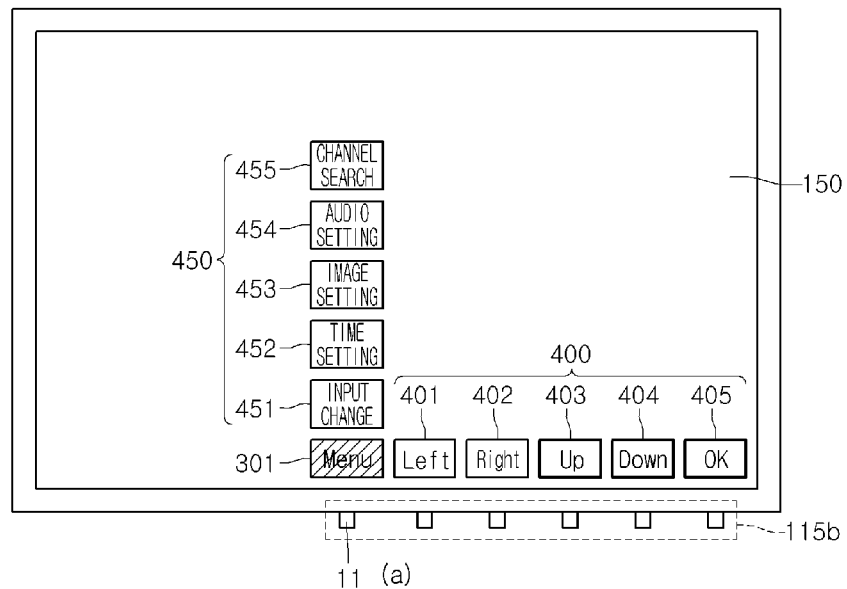
FIG. 4 is an exemplary diagram of an OSD screen for control key inputs according to an embodiment.
Figure 4:
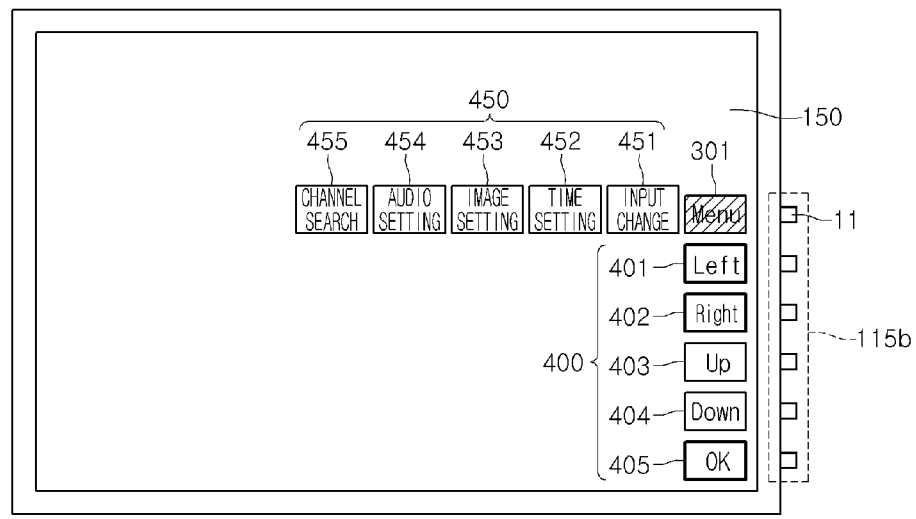

That is, to describe the exemplary diagram of the display screen shown in FIG. 3, when any one of the plurality of control keys 115*b* is inputted by a user from the key input unit 115 provided on a horizontal or longitudinal side of the image display device, the control unit 105 displays OSDs 300 for the plurality of control keys 115*b* in the display unit 150, irrespective of the kind of control key that was selected. FIG. 3A is an exemplary diagram showing a case where the control keys 115*b* of the key input unit 115 are positioned at a horizontal lower side of the image display device, and FIG. 3B is an exemplary diagram displaying OSDs in a case where the control keys 115*b* of the key input unit 115 are positioned at a longitudinal side of the image display device. The OSDs for the control keys 115*b* respectively represent the functions corresponding to the respective control keys 115*b*.

Therefore, in the image output mode, when a key input signal from the key input unit 115 is detected, the control unit 105 respectively displays OSDs 301 to 306 for the control keys 115*b* corresponding to the location where the key input unit 115 of the image display device is provided, as in the exemplary diagram of FIG. 3A or 3B.

In operation S220, the control unit 105 detects whether one of the control keys 115*b* (hereinafter, a first control key 11) is inputted during the displaying of OSDs for the control keys 115*b* as in the exemplary diagram of FIG. 3A.

While the OSDs 300 for the control keys 115*b* are displayed, an input standby time for the first control key 11 is counted in operation S225, and if no key input signal is detected for a predetermined time in operation S230, the displaying of the OSDs 300 for the control keys 115*b* is ended.

On the other hand, if the input of the first control key 11 is detected while the OSDs 300 for the control keys 115*b* are displayed, OSDs 450 for menu items corresponding to the inputted first control key 11 is displayed in operation S235. The OSD 301 for the inputted first control key 11 may be displayed in one of up, down, left and right directions of the OSD 301 for the inputted first control key 11.

Then, to select any one item among the menu items presented by the OSDs 450 for the inputted first control key 11, the control unit 105 changes the displayed OSDs 302 to 306 to select key OSDs 400 to display the select key OSDs 400 in operation S240. The select key OSDs 400 are displayed to include directional key OSDs of Left 401, Right 402, Up 403, and Down 404 for selecting any one of the menu item OSDs 450 for the inputted first control key 11, and an OK key OSD 405 representing an input key for setup completion.

Further, when the select key OSDs 400 are displayed, only OSDs representing keys that can be used to select the menu items are highlighted and displayed. For instance, in FIG. 4A, as the menu item OSDs 450 are displayed vertically upward on the image display device, the directional key OSDs 403 and 404 representing the directional keys which are movable in Up/Down directions and the OK key OSD 405 are displayed highlighted. Also, as shown in FIG. 4B, as the menu item OSDs 450 are displayed horizontally across, the directional key OSDs 401 and 402 representing the directional keys movable Left/Right and the OK key OSD 405 are displayed highlighted.

As described above, the operation of the image display device according to an embodiment displays OSDs for the control keys when a control key input from the key input unit provided at one side of the image display device is detected. When any one control key is input during the displaying of the OSDs, the menu item OSDs for the inputted control key are displayed, and the directional key OSDs for the plurality of control keys are displayed in order to select the menu item OSDs.

Figure 5:
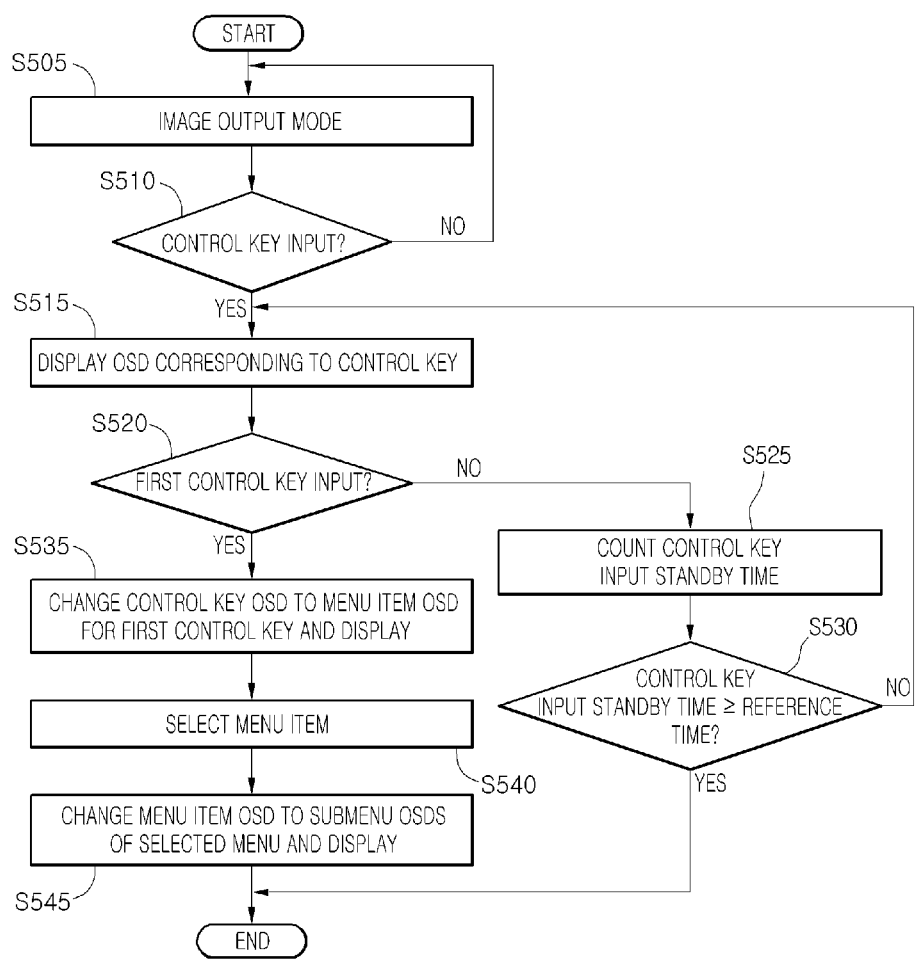
FIG. 5 is flowchart for a control key OSD screen according to another embodiment.
Figure 6:
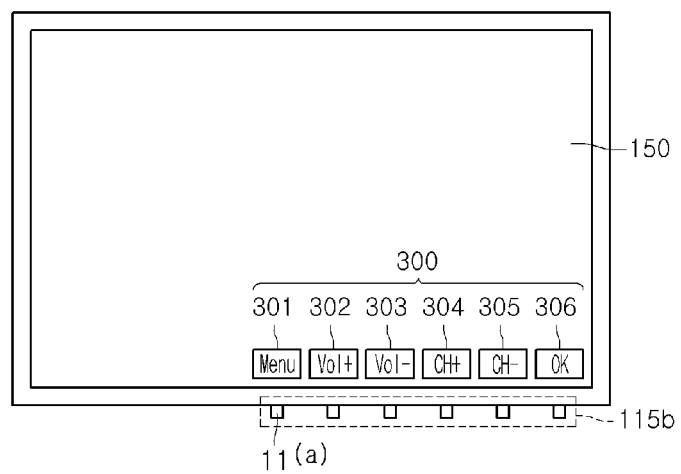
FIG. 6 is an exemplary diagram of an OSD screen for control key inputs according to another embodiment.
Figure 6:
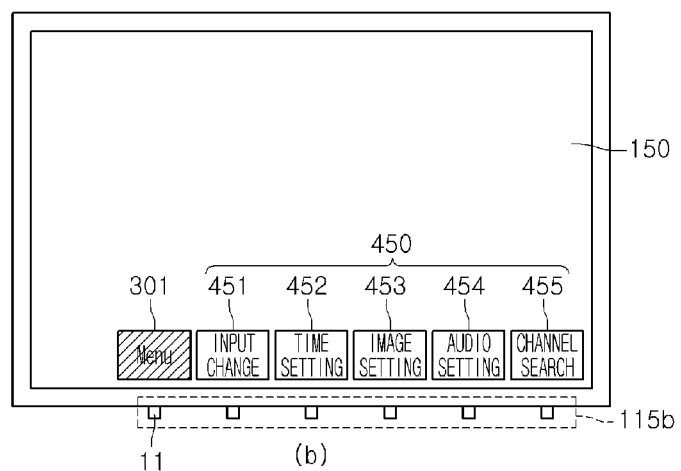
Figure 6:
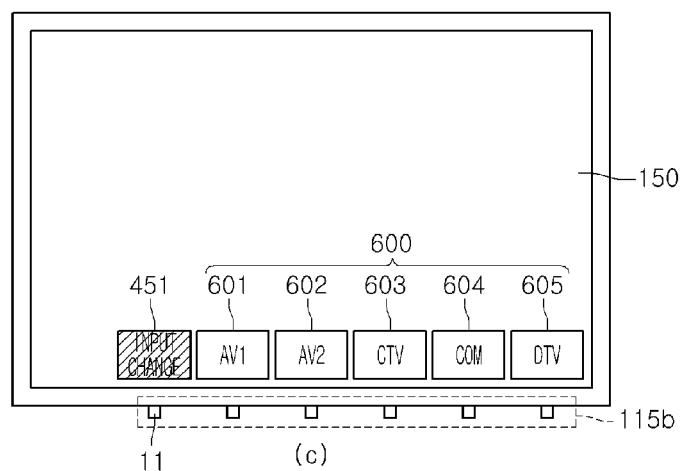

FIGS. 5 and 6 are a control operation flowchart and a diagram of exemplary screens of an image display device according to another embodiment. A detailed description is provided with reference to FIGS. 5 and 6.

During the image output mode in operation S505, when the control unit 105 detects an input of a control key 115*b* having menu keys for controlling the image display device from the plurality of keys in the key input unit 115 in operation S510, the OSDs 300 corresponding to the inputted control key are displayed. As in the previous embodiment, all of the OSDs for the control keys 115*b* are displayed, irrespective of the control key that was input. Alternatively, only OSDs for the inputted control key may be displayed. As in the previous embodiment, in this embodiment, all OSDs for the plurality of control keys are displayed, irrespective of the inputted control key.

As in FIG. 6, in the image output mode, when the control unit 105 detects the input of any one key 11 of the control keys 115*b*, the OSDs 300 representing the functions for the plurality of control keys 115*b* are output in the display unit 150 in operation S515.

The control unit 105 senses whether the first control key 11 is inputted in operation S520 while the OSDs 300 for the control keys 115*b* are displayed. Namely, an input standby time for a second control key is counted in operation S525 while the OSDs 300 for the control keys 115*b* are displayed. If any key input signal is not detected for a predetermined time in operation S530, the displaying of the OSDs 300 for the control keys 11*b* is ended.

On the other hand, when the control unit 105 detects the input of the first control key 11 while the OSD 300s for the respective control keys 115*b* are displayed, the OSDs 302 to 306 except for the OSD 301 for the first control key 11 are changed into the menu item OSDs 450 for the first control key 11 and displayed in operation S535. In other words, when a first control key that is a 'menu key' 11 according to an embodiment is received while OSDs 300 for a plurality of control keys 115*b* are displayed (as in FIG. 6), the menu item OSDs 451 to 455 for the 'menu key' 11 are displayed corresponding to the control keys 115*b*. The menu item OSDs 450 according to an embodiment may include for example ones representing an 'input conversion' OSD 451, a 'time setup'

OSD 452, an 'image setup' OSD 453, an 'audio setup' OSD 454 and a 'channel search' OSD 455.

Therefore, when the input of the second control key for choosing any one of the menu item OSDs is detected in operation S540 while the menu item OSDs for the first inputted control key 11 are displayed, submenu item OSDs 600 of the menu item chosen based on the inputted second control key 11 are displayed. In operation S545, the submenu item OSDs 600 are displayed such that the menu item OSDs 450 are changed into the submenu item OSDs 600 as shown in FIG. 6C, similar to the manner in which the menu item OSDs are displayed.

That is to say, as in the exemplary diagram of the display screens shown in FIG. 6B, when the OSDs 450 for the 'menu key' 11 are displayed, if the 'input conversion' OSD 451 of the menu items for the 'menu key' 11 is chosen, the menu item OSDs 450 are changed to the submenu item OSDs 600 for the 'input conversion' items (as shown in FIG. 6C) and displayed. Submenu items according to embodiments may include, for example, 'AV1' 601, 'AV2' 602, 'CTV' 603, 'COM' 604 and 'DTV' 605.

The submenu item OSDs may be displayed to correspond to the location of the plurality of control keys 115b, and selectable OSDs may be displayed highlighted.

The present invention has the effects of enabling the use of control keys provided on an image display device to execute control operations similarly to a remote controller, and enabling quick and easy inputting of control signals for an image display device using control keys.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling an image display device, the method comprising:
   detecting a first input of at least one of a plurality of control key buttons provided at a predetermined area on the image display device;
   displaying a plurality of control key OSDs (On-Screen Displays) which correspond to the control key buttons, respectively, on a first display area of the image display device, the control key OSDs and the control key buttons being in parallel to each other and being arranged along a horizontal direction;
   receiving a second input of a first control key button while the control key OSDs are displayed;
   displaying a plurality of menu item OSDs on a second display area of the image display device in response to the second input, the plurality of menu item OSDs being arranged in a line along a vertical direction from a control key OSD corresponding to the first control key button; and
   displaying a plurality of select key OSDs on a portion of the first display area of the image display device at which the displayed control key OSDs other than the control key OSD corresponding to the first control key button disappear, the plurality of select key OSDs selecting one of the plurality of menu item OSDs, and the plurality of select key OSDs and the control key buttons being in parallel to each other and being arranged along the horizontal direction,
   wherein types of select keys included in the plurality of select key OSDs are different from types of corresponding control keys included in the corresponding control key OSDs,
   wherein all of the select keys included in the plurality of select key OSDs are dedicated directional keys which correspond to the mounting positions of the control key buttons, respectively, and
   wherein the plurality of menu item OSDs and the plurality of select key OSDs are simultaneously displayed on different areas of the image display device in response to the input of the first control key button.

2. The method according to claim 1, wherein the plurality of select key OSDs include Up, Down, Left and Right directional key OSDs.

3. The method according to claim 2, wherein in the displaying of the directional key OSDs, only the at least one usable directional key OSD is displayed highlighted.

4. The method of claim 1, wherein the control key OSDs do not include directional key OSDs.

5. An image display device comprising:
   a key input unit including a plurality of control key buttons at a predetermined area on the image display device;
   an OSD (On-Screen Display) processing unit configured to generate a plurality of control key OSDs which correspond to the control key buttons, respectively, the control key OSDs and the control key buttons being in parallel to each other and being arranged along a horizontal direction;
   a display unit configured to display the control key OSDs respectively corresponding to the control key buttons when a first input of at least one of control key buttons is detected; and
   a control unit configured to:
      detect a signal of a second input of a first control key button while the control key OSDs are displayed,
      display a plurality of menu item OSDs on a second display area of the image display device in response to the second input, the plurality of menu item OSDs being arranged in a line along a vertical direction from a control key OSD corresponding to the first control key button, and
      display a plurality of select key OSDs on a portion of the first display area of the image display device at which the displayed control key OSDs other than the control key OSD corresponding to the first control key button disappear, the plurality of select key OSDs selecting one of the plurality of menu item OSDs, and the plurality of select key OSDs and the control key buttons being in parallel to each other and being arranged along the horizontal direction,
   wherein types of select keys included in the plurality of select key OSDs are different from types of corresponding control keys included in the corresponding control key OSDs,
   wherein all of the select keys included in the plurality of select key OSDs are dedicated direction keys which correspond to the mounting positions of the control key buttons, respectively, and
   wherein the plurality of menu item OSDs and the plurality of select key OSDs are simultaneously displayed on different areas of the image display device in response to the input of the first control key button.

6. The image display device of claim 5, wherein the plurality of select key OSDs include Up, Down, Left and Right directional key OSDs.

7. The image display device of claim 6, wherein the control unit controls the display unit to display only the at least one usable directional key OSD highlighted.

\* \* \* \* \*